UNITED STATES PATENT OFFICE.

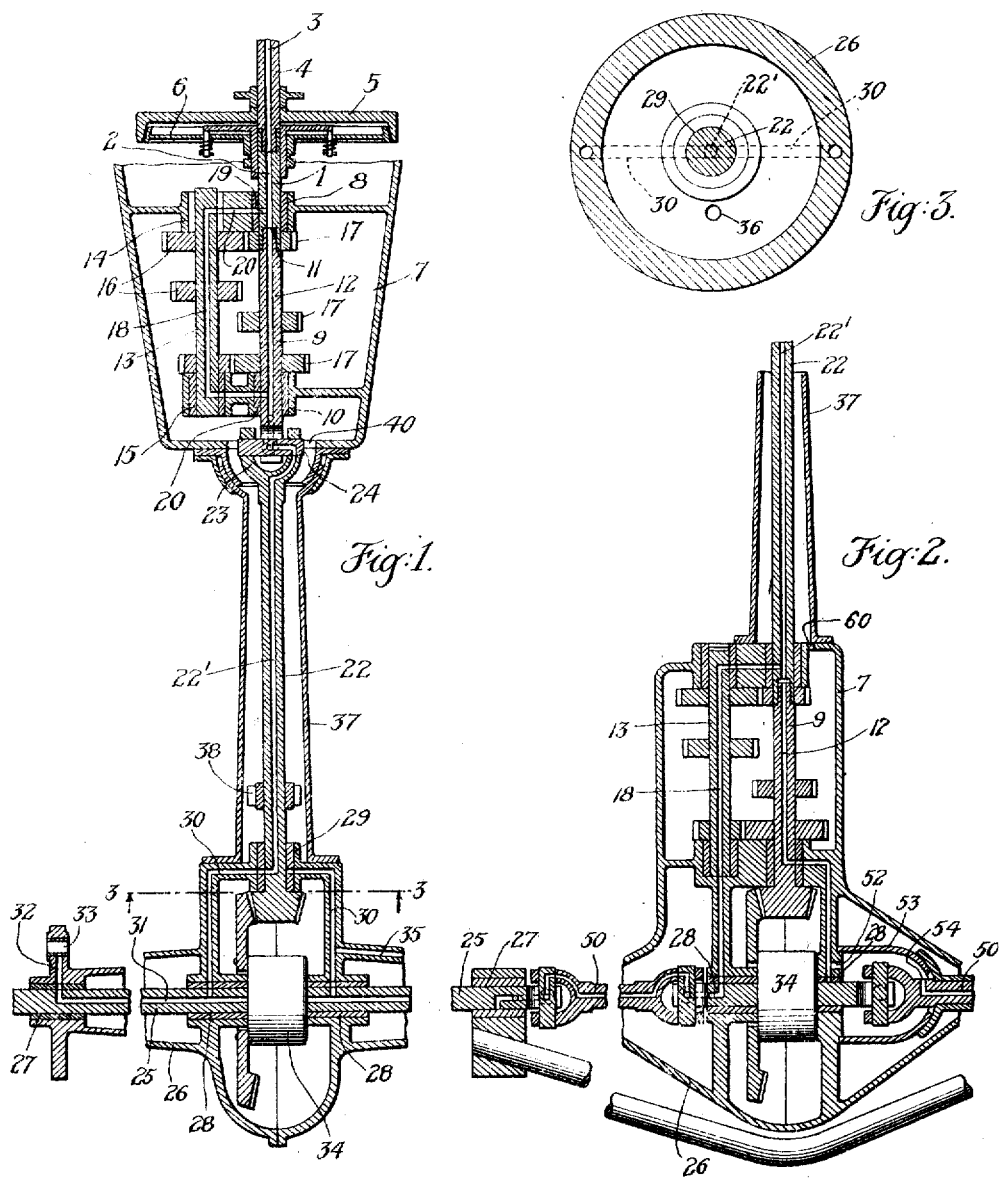

JOSEPH B. FERGUSON, OF NEWARK, NEW JERSEY.

MOTOR-VEHICLE.

1,272,648.　　　　　Specification of Letters Patent.　　Patented July 16, 1918.

Application filed April 11, 1917. Serial No. 161,122.

*To all whom it may concern:*

Be it known that I, JOSEPH B. FERGUSON, a subject of the King of Great Britain, and a resident of the city of Newark, county of Essex, State of New Jersey, have invented certain new and useful Improvements in Motor-Vehicles, of which the following is a specification.

My invention relates to improvements in motor vehicles and generally to the lubrication thereof, and particularly to the lubrication of the bearings of gear-box, universal joint and rear axle by means of an oil passage adapted to supply oil under pressure, all of which may or may not include extensions leading to such parts as brake spindle bearings and springs.

In motor vehicles it is customary to lubricate the bearings and gears of a gear box and the bearings of the engine gears and bearings of the rear axle by separate lubrication systems, and, in some cases, there is a common system for two of these, as, for instance, when the gear box is built on the engine frame, or when the gear box is built on the rear axle. In either of these cases there would be two main systems, but many subsidiary parts, such as universal joints, spindle bearings, and so forth, will require separate and individual lubrication sources. In some cases, a universal joint has been inclosed in a gear box, but it is one object of my invention to lubricate the whole transmission system from the engine back—that is to say, the gear box, universal joint, propeller shaft, differential gearing and rear axle (and if desirable, other parts, such as brake spindle bearings and spring)—by means of a single system for lubricating supplied with lubricant under pressure.

A further object of my invention is to provide a lubrication system for conducting oil from some part on the frame of the vehicle to the rear axle and provide means for returning the lubricant to the frame so that it may be conserved or forced through the lubricating system over again as may be desired.

An incidental object my invention is to carry oil from the frame of the vehicle to the rear axle thereof.

A further and subsidiary object of my invention is to provide a system for lubricating the brake spindles and springs and spring mountings associated with the rear axle, which system is supplied from the rear axle.

Other and further objects and advantages will appear from the following description, taken in connection with the accompanying drawings, forming a part of this specification, and they will be pointed out in the appended claims.

In the drawings in which like reference characters designate similar parts,

Figure 1 is a diagrammatic sectional view, with parts broken away, of mechanism for transmitting power from the engine to the driving wheels of a motor vehicle, and embodying my invention;

Fig. 2 shows a modification of the structure shown in Fig. 1;

Fig. 3 is a section on the line 3—3 of Fig. 1;

According to my invention, oil is supplied under pressure to the main gear box of the shaft and is led through various branches to the bearings with the gear box to the propeller shaft and thence to the rear axle, branches being provided to supply universal joint bearings from the inside and there is a passage leading oil to the various bearings on the rear axle and parts associated therewith, such as brake spindle bearings and spring mountings.

In the structure illustrated in the drawings for the purpose of assisting in disclosing one embodiment of my invention for the purposes of interpretation, particularly referring to Fig. 1, a main gear-box shaft 1 is provided with a lubricant circulation passage 2. The lubricant may be supplied to the passage 2 under pressure by any means, for example, through the passage 3 of the engine driven shaft 4, to which is keyed the fly-wheel 5. Clutch mechanism 6, of any type, may serve to connect the shaft 1 to shaft 4. This, however, forms no part of my invention. The gear-box 7 may or may not be formed on the engine casing. It is preferably attached to and part of the vehicle frame. The shaft 1 is mounted in the bearing 8 and the main shaft 9 is mounted in the bearing 10 and in the bearing 11 formed in the rear end of the shaft 1. The main shaft 9 is provided with a lubricant passage 12 communicating with the passage 2. A lay-shaft 13 mounted in the bearings 14 and 15 carries the various gears 16 which are arranged for coöperation with the gears 17 on the main shaft 9, the gearing arrangement forming, however, no part of my invention. The lay-shaft 13 is provided with a longitudinal lubricant passage 18 which is closed at its ends. A transverse lubricant passage 19 conducts lubricant from the passage 2 to the passage 20 within a wall of the gear box and this, in turn, conducts lubricant into the passage 18 through a transverse passage, as shown. The passage 18 is also connected to the passage 12 through a transverse passage 19 in the main shaft 9 by a passage 20 in the wall of the gear box and a transverse branch of the passage 18, as shown.

The shaft 4 may have a bearing within the shaft 1. It is evident from the structure so far described that lubricant will be conducted to all the bearings of the main and auxiliary shafting leading from the engine to the rear of the gear box. The main propeller shaft 22 is joined to the main shaft 9 by means of the universal joint 23 and is provided with a lubricant passage 22' which communicates with the passage 12 by means of a passage through the pin 24 of the universal joint, as shown.

The rear axle 25 is mounted in the bearings 27 and 28 of its housing 26. The propeller shaft 22 is mounted in the rear axle housing in bearing 29, and lubricant passing through the passage 22' lubricates this bearing and is conducted through the passage 30 in the rear axle housing to the bearings 28 and conducts oil to the lubricant passage 31 in the rear axle. From this lubricant is conducted to the bearings 27 and through the passages 32 to the brake spindle bearing 33. It is apparent that oil can be conducted to the spring mountings and any other part associated with the axle housing, just as it is conducted to the bearings 33, as through the auxiliary passage 35. The differential gearing is contained in the housing 34 and lubricant is conducted to it through the passage 31.

The lubricant being supplied under considerable pressure, it is possible to use plain bearings, but I do not confine myself to this particular type. It is desirable that the oil shall be conserved and means is provided for conducting the oil back to the vehicle frame, and as shown in Fig. 3, a passage 36 is provided below the propeller shaft bearing 29, whereby excess oil may flow out of the rear axle housing. A tubular housing 37 extends from the rear axle housing to the gear box and the driving force may be transmitted by it or it may act as a torsion member or it may perform neither of these functions. However, the lubricant flows through the passage 36 into it and is carried either with or without the assistance of the propelling blade 38, through the tube and through the passage 40 into the gear box. The lubricant may be kept at a certain level in the gear box and run into a sump where it may be purified and run through the system again as desired.

In Fig. 2, I have shown a modification wherein the gear box is made integral with the rear axle housing, and the lubricant system may be split up into two parts, one leading from the passage 18 in the lay shaft and the other from the passage 12 in the main shaft. Oil is kept at the proper level by overflowing through passage 60.

Other modifications of the structure are also shown in this figure. The drive from the differential gearing to the outer ends of the rear axle may be through Cardan shafts 50, the lubricant being conducted through the universal joint in the same manner in which it is conducted through the universal joint 23. In this form, the housing for the differential gearing and the gear box may be mounted on the frame and the drive to the rear wheels will be effected through the Cardan shafts. This, however, is not necessary, and all may be mounted upon the rear wheels unsprung.

An alternative method of lubricating the universal joint is shown by carrying the lubricant through the auxiliary passage 52 to the interior of an auxiliary casing 53, in which is contained a universal joint and conducting the lubricant from said auxiliary chamber to the interior of the axle through a transverse passage 54. The same arrangement for carrying the lubricant forward to the location 37 is provided in this embodiment of my invention.

By this invention it is possible to lubricate under pressure all bearings behind the clutch. It has previously been proposed to circulate oil between the axle casing and the gear box by means of a pump in the axle casing, but in such a case the bearings were not supplied under pressure, whereas by the present invention pressure lubrication throughout is possible, which is practically essential where plain bearings are used. It is obvious that many places where hollow shafts are used, the oil being conducted along the shaft, it might be possible to employ a separate oil tube fixed to the shaft, and in the same way it is not essential that the oil passages be formed in the casing walls as they may be constituted by tubes attached to the walls.

While I have described in great detail the specific embodiment of my invention, I do not desire or intend that I shall be limited to the details disclosed, but intend that such modifications, variations and adaptations as occur to those skilled in the art shall fall within the scope of my invention which I intend shall be defined by the hereunto appended claims.

Having described my invention, what I claim as new and desire to secure by Letters Patent is:

1. In a motor vehicle, a frame, a driving axle, a propeller shaft for transmitting power to said axle and provided with means for conducting lubricant to said axle and means for conducting lubricant from said axle to said frame.

2. In a motor vehicle, a frame, a driving axle, means for conducting lubricant from said frame to said axle and means for conducting lubricant from said axle to said frame.

3. In a motor vehicle, a frame, a driving axle, means for conducting lubricant to said axle and means for conducting lubricant from said axle to said frame.

4. In a gear-box, a driving shaft, a driven shaft, a lay-shaft, said driving and driven shafts being provided with lubricant passages and said lay-shaft having a lubricant passage and means providing communication between said passages of said driving and driven shafts and said passage of said lay-shaft.

5. In a motor vehicle, a gear-box, a driving axle and a shaft for transmitting power from said gear-box to said axle, said shaft being provided with means for conducting lubricant to said driving axle from said gear-box.

6. In a motor vehicle the combination with a gear-box, a driving axle and a propeller shaft, including a universal joint and arranged to transmit power from said gear-box to said axle of a single pressure lubrication system for substantially all parts thereof including an oil passage through some of said parts.

7. In a motor vehicle, a driving axle and a shaft for transmitting power to said axle, said shaft being provided with means for conducting lubricant to said driving axle.

8. In a motor vehicle, a driving axle and means for conducting lubricant thereto, said axle being provided with means for conducting lubricant under pressure to auxiliaries associated therewith.

9. In a motor vehicle a driving axle, a driven axle, a propeller shaft, means for connecting said propeller shaft with said driving shaft at various speed relations, a universal joint between said means and said propeller shaft, each of said parts being provided with a passage through which lubricant under pressure may be forced thereby lubricating said parts.

In testimony whereof, I have signed my name to this specification.

JOSEPH B. FERGUSON.